United States Patent
Hamburg

(10) Patent No.: US 11,961,420 B2
(45) Date of Patent: Apr. 16, 2024

(54) EFFICIENT SQUARING WITH LOOP EQUALIZATION IN ARITHMETIC LOGIC UNITS

(71) Applicant: Cryptography Research, Inc., San Jose, CA (US)

(72) Inventor: Michael Alexander Hamburg, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 231 days.

(21) Appl. No.: 17/309,933

(22) PCT Filed: Jan. 6, 2020

(86) PCT No.: PCT/US2020/012418
§ 371 (c)(1),
(2) Date: Jul. 1, 2021

(87) PCT Pub. No.: WO2020/146284
PCT Pub. Date: Jul. 16, 2020

(65) Prior Publication Data
US 2022/0076594 A1      Mar. 10, 2022

Related U.S. Application Data

(60) Provisional application No. 62/892,896, filed on Aug. 28, 2019, provisional application No. 62/789,103, filed on Jan. 7, 2019.

(51) Int. Cl.
*H04L 29/06* (2006.01)
*G06F 7/57* (2006.01)
(Continued)

(52) U.S. Cl.
CPC ............... *G09C 1/00* (2013.01); *G06F 7/57* (2013.01); *G06F 7/728* (2013.01); *H04L 9/3013* (2013.01); *H04L 9/302* (2013.01); *H04L 9/3066* (2013.01)

(58) Field of Classification Search
CPC ...... H04L 9/3066; H04L 9/3013; H04L 9/302
See application file for complete search history.

(56) References Cited

U.S. PATENT DOCUMENTS 8,817,972 B2 * 8/2014 Gaborit ............... H04L 9/304
380/278
2006/0133603 A1 * 6/2006 Joye ................. H04L 9/003
380/28

(Continued)

FOREIGN PATENT DOCUMENTS

CA      2251178 A1      10/1998

OTHER PUBLICATIONS

Notification of Transmittal of the International Search Report and the Written Opinion of the International Searching Authority, or the Declaration dated Mar. 17, 2020 re: Int'l Appln. No. PCT/US20/012418. 50 Pages.

*Primary Examiner* — Dao Q Ho
(74) *Attorney, Agent, or Firm* — Lowenstein Sandler LLP

(57) ABSTRACT

Aspects of the present disclosure describe a method and a system to support execution of the method to perform a cryptographic operation involving identifying an N-word number, $X = X_{N-1} \ldots X_1 X_0$, to be squared, performing a first loop comprising M first loop iterations, wherein M is a largest integer not exceeding $(N+1)/2$, each of the M first loop iterations comprising a second loop that comprises a plurality of second loop iterations, wherein an iteration m of the second loop that is within an iteration j of the first loop comprises computing a product $X_a * X_b$ of a word $X_a$ and a (Continued)

word $X_b$, wherein $a+b=2j+m$, $j\geq 0$ and $m\geq 0$, and wherein all second loops have an equal number of second loop iterations.

20 Claims, 9 Drawing Sheets

(51) Int. Cl.
    *G06F 7/72*           (2006.01)
    *G09C 1/00*          (2006.01)
    *H04L 9/30*          (2006.01)

(56) References Cited

U.S. PATENT DOCUMENTS

| | | | |
|---|---|---|---|
| 2014/0067893 A1* | 3/2014 | Thornton | G06F 7/544 |
| | | | 708/490 |
| 2014/0281573 A1* | 9/2014 | Jaffe | H04L 9/003 |
| | | | 713/189 |
| 2018/0101362 A1* | 4/2018 | Servant | G06F 9/30098 |
| 2020/0293317 A1* | 9/2020 | Kobayashi | G06F 9/30145 |
| 2022/0076594 A1* | 3/2022 | Hamburg | G06F 7/57 |

* cited by examiner

EFFICIENT SQUARING WITH LOOP EQUALIZATION IN ARITHMETIC LOGIC UNITS

RELATED APPLICATIONS

This application relates to U.S. Provisional Application No. 62/789,103 filed on Jan. 7, 2019, the entire contents of which are incorporated herein by reference.

TECHNICAL FIELD

The disclosure pertains to cryptographic computing applications, more specifically to implementations of multiplication of numbers on computer hardware and software.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1A:
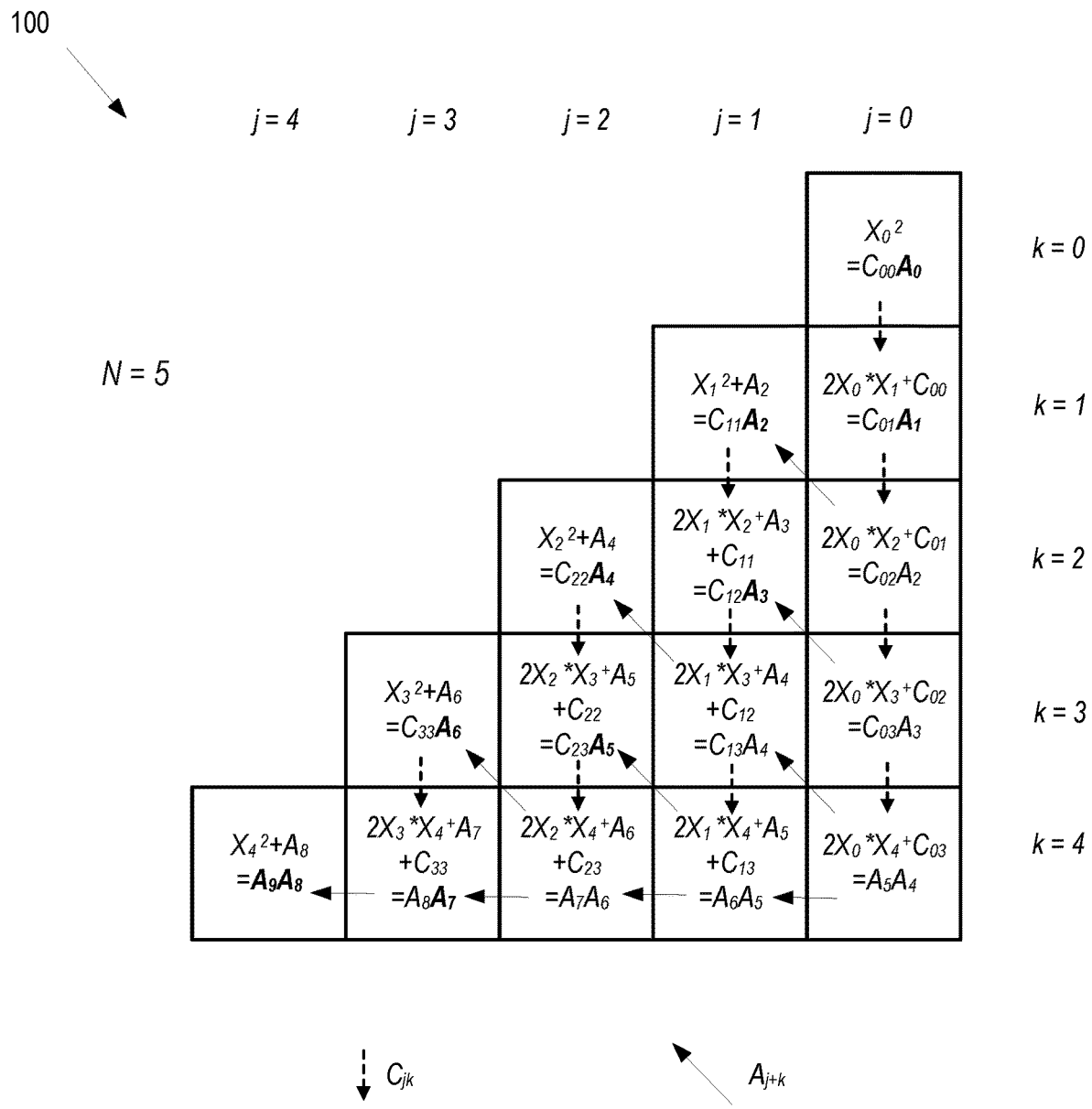
FIG. 1A illustrates schematically an implementation of an efficient squaring algorithm with loops of unequal length for an exemplary case of an input number having N=5 words.

Aspects of the present disclosure are directed to efficient squaring with loop equalization that may be used in applications employing cryptographic algorithms, such as applications employing modular arithmetic computation.

In public-key cryptography systems, a processing device may have various components/modules used for cryptographic operations on input messages. Input messages used in such operations are often large binary numbers (e.g., multi-word integers) that require many clock cycles to be processed, especially when performed on low-bit microprocessors, such as smart card readers, wireless sensor nodes, and so on. Examples of cryptographic operations include, but are not limited to operations involving Rivest-Shamir-Adelman (RSA) and Diffie Hellman (DH) keys, digital signature algorithms (DSA) to authenticate messages transmitted between nodes of the public-key cryptography system, various elliptic curve cryptography schemes, etc. Cryptographic algorithms often involve modular arithmetic operations with modulus M in which the set of all integers Z is wrapped around a circle of length M, so that any two numbers that differ by (M or any other integer multiple of M) are treated as the same number. The resulting set is called "the ring of integers modulo M" or Z/M. A modular (modulo M) multiplication operation, AB mod M, may produce the same result for many more different sets of the multiplicand A and the multiplier B than for conventional arithmetic operations. For example, if it is known that a product of conventional multiplication of two positive integers is 6, it may then be determined that the two factors (the multiplicand and the multiplier, or vice versa) must necessarily be either 2 and 3 or 1 and 6 In modular arithmetic, however, this is no longer the case. For example, if M=12, the same product AB mod 12=6 may result from the pairs of factors 2 and 3, 3 and 6, 5 and 6, 6 and 7, 6 and 9, and so on. This happens because 6, 18, 30, 42, 54, etc., represent the same number modulo M=12 as all these numbers differ from each other by an integer multiple of M. In other words, when any of these integers is divided by M, the remainder of the division is the same, i.e. 6. Cryptographic applications exploit the fact that extracting the value of the private key A from a public key $P=B^A$ mod M may be a prohibitively difficult operation even when B is known, provided that A and M are sufficiently large. Similarly, a digital signature can be generated using a modular exponentiation technique. For example, when such algorithm is used as the basis of public-key cryptography, the signature S is computed in the form of the equation, $S=K^d$ mod M, where M is a public modulus, and d is a private exponent.

Calculations modulo M require performing a division operation to determine a remainder at the end. However, division operations are simple on paper but very expensive to perform on a computer hardware, especially if operands are large. Performing divisions is particularly challenging on embedded microprocessors with limited resources. To address this problem, an additional operation—a Montgomery reduction—is often used to find AB mod M. Montgomery reduction involves a transformation into a Montgomery domain by first rescaling the multiplicand (i.e. performing an operation AR mod M) and the multiplier (BR mod M) by a number (Montgomery radix) R that is typically a power of the base r, e.g. $R=r^n$, with some exponent n such that $r^n > M$ (e.g. for M=87, the rescaling factor may be R=100), and then adding such integer number of M to the product (AR mod M)*(BR mod M) that the last n digits turn into zeros. These last digits may then eliminated by right-shifting (which is one division operation—although rather simple—that is encountered in the Montgomery reduction technique) before the outcome is converted back from the Montgomery domain by one final multiplication by a fixed predetermined number (1/R) mod M.

One of significant challenges of computational cryptography is optimization of hardware resources for efficient multiplication and Montgomery reduction of large numbers. In a typical setup, a multiplicand and/or multiplier may be represented by N*W bits grouped into N words with W bits in each word. The size of the word W may be determined by micro-architectural properties of a processor performing multiplication, e.g. by an arithmetic logic unit (ALU) of the processor. For example, in one implementation, a number may be represented with N=8 words of W=32 bits in each word, for the total of 256 bits in the number. In other implementations, the word size W may be a different number. For example, in some implementations, the word size may be one bit, W=1. In further implementations, the word size may be any integer power of two (e.g., 2 bits, 4 bits, 8 bits, 16 bits, 64 bits, and so on). In some implementations, the word size may be the size of an operand of a processor (a processing unit, such as ALU) performing arithmetic operations. The number of words N may be a large number in cryptographic applications. For example, in RSA applications, the total number of bits may be 1024. Correspondingly, a microprocessor that can operate on W=8 operands may have to perform N=128 loadings of various words of the number to perform an operation with this number More specifically, the ALU may operate on an N-word number $X = X_{N-1}\ X_{N-2}\ \ldots\ X_1\ X_0$, which may also be represented as the sum, $$X = \sum_{j=0}^{N-1} X_j r^j,\ X_j < r,$$

over increasing powers of a base r, which in binary computations may be a power of two, $r=2^W$, in one implementation, although implementations disclosed herein apply to any base, such as the base $r=10^W$ or $r=16^W$, for example. The ALU may perform computations involving the number X by executing operations on various words (operands) X starting with the words containing less-significant bits (or digits), $X_0, X_1 \ldots$, and proceeding towards the words containing more-significant bits (or digits). When two numbers X and Y are multiplied, the result may be a 2N-word number Z:

$$Z = X * Y = (X_0 r^0 + X_1 r^1 + X_2 r^2 + \ldots) * (Y_0 r^0 + Y_1 r^1 + Y_2 r^2 + \ldots) \quad (1)$$
$$= X_0 Y_0 r^0$$
$$+ (X_0 Y_1 + X_1 Y_0) r^1$$
$$+ (X_0 Y_2 + X_1 Y_1 + X_2 Y_0) r^2 +$$
$$+ (X_0 Y_3 + X_1 Y_2 + X_2 Y_1 + X_3 Y_0) r^3 + \ldots$$

In computing implementations of multiplication Z=X*Y, the processing device may follow Eq. (1) and calculate the l-th order sums $S_l$ in the parentheses of the consecutive lines in Eq. (1), $$Z = \sum_{l=0}^{2N-2} S_l r^l$$

corresponding to a given power $r^l$. Because, in general, the sums $S_l$ may exceed r, to obtain the word representation of the result, $$Z = \sum_{l=0}^{2N-1} Z_l r^l,\ Z_l < r,$$

the excesses $S_l/r$ (if present) must be carried over to the next line l+1. Accordingly, the word $Z_l$ of the result is given by the low word of $S_l$ (after a carry from the previous order l is added) while the high word of $S_l$ becomes the carry for the next line l+1. This process is repeated until the last line is reached, l=2N−2, where the low word of $S_{2N-2}$ (plus a carry from the previous order) gives $Z_{2N-2}$ whereas the high word yields $Z_{2N-1}$.

The above described method-referred to as product-scanning—is close in implementation to the intuitively simple "schoolbook" algorithm. In the product-scanning algorithm, to compute the sum $S_l$, the processing device has to load the l+1 least significant words of X and the l+1 least significant words of Y. As a consequence, the same words of both the multiplicand and the multiplier may have to be repeatedly loaded into the ALU. In contrast, in the operand-scanning method each of the words $X_j$ is loaded only once and multiplied by the loaded word by words $Y_k$ of the multiplier in a consecutive fashion, computing the corresponding product, carrying the high word of the product to the next operation $X_j * Y_{k+1}$ and storing the low word in an accumulator A to be added to the next operation of the same order, $X_{j+1} * Y_{k-1}$ performed on the $X_{j+1}$ word of the multiplicand.

Both the product-scanning and the operand-scanning methods are suitable for implementation in hardware. Which design is more efficient depends on the exact operations to be performed, on the desired performance, and on the desired memory configuration. Product-scanning may be more efficient for raw multiplication, whereas operand-scanning may be more efficient for multiplication with integrated Montgomery reduction or integrated Barrett reduction.

In both the product-scanning and the operand-scanning methods, further optimization may be achieved in cases where multiplication operation is a squaring operation, i.e. where a multiplicand is the same as a multiplier, X=Y. In such situations only the "diagonal" multiplications $X_j * X_j$ and "off-diagonal" multiplications $X_j * X_k$ with k>j need to be performed. The result of the latter operations may be doubled to account for the fact that such operations are encountered twice in the product X*Y. More specifically, squaring of X is performed based on the following identity:

$$Z = X^2 = (X_0 r^0 + X_1 r^1 + X_2 r^2 + \ldots) * (X_0 r^0 + X_1 r^1 + X_2 r^2 + \ldots) \quad (2)$$
$$= X_0^2 r^0$$
$$+ 2X_0 X_1 r^1$$
$$+ (X_1^2 + 2X_0 X_2) r^2 +$$
$$+ (2X_0 X_3 + 2X_1 X_2) r^3$$
$$+ (X_2^2 + 2X_0 X_4 + 2X_1 X_3) r^4 + \ldots$$

Accordingly, for an even l the l-th order sum is (for l>0)

$$S_l = X_{l/2}^2 + \sum_{j=0}^{\frac{l}{2}-1} 2X_j X_{l-j}$$

while for an odd l the l-th order sum is $$S_l = \sum_{j=0}^{\frac{l-1}{2}} 2X_j X_{l-j}.$$

The operand-scanning algorithm for efficient squaring may be performed as follows. At each step, one multiplicand word $X_j$ with $0 \leq j \leq N-1$ may be multiplied by one multiplier word $Y_k$ with $j \leq k \leq N-1$ to obtain the product $X_j * Y_k$. The result (after proper carries and accumulators are added as described below) $C_{jk}A_{j+k}$ may be stored as a combination of the low word accumulator $A_{j+k}$ and a high word carry $C_{jk}$. The algorithm may begin with assigning zero values to all accumulators and carries. An outer loop of the algorithm may cycle through N words $X_j$ and the inner loop of the algorithm may cycle through N−j words $Y_k$ wherein $k \geq j$. Each j-th inner loop (the inner loops are numbered beginning with j=0) begins with a diagonal iteration k=j where the following operation is performed (with the exception of the very last loop, as explained below):

$$j = k \neq N - 1: C_{jj}A_{2j} \leftarrow X_j^2 + A_{2j},$$

where the accumulator determined during the previous inner loop j−1 is added (no prior accumulation occurs for the first iteration of the first inner loop j=0 since all accumulators are set to zero at the beginning of the algorithm).

The inner loop j then proceeds with iterations k>j. At each iteration, a prior carry from the same inner loop j is added (with the exception of the very last iteration in each inner loop):

$$j < k \neq N-1: C_{jk}A_{j+k} \leftarrow 2X_j * X_k + C_{j,k-1} + A_{j+k}.$$

While carries remain confined within a given inner loop, the accumulators cross over to the next inner loops and are added to the multiplication products that have the same order index l=j+k, so that after all iterations of both loops having the same index l have been executed, the accumulator $A_l$ will coincide with the l-th word of the result $Z_l$ of the squaring operation.

Finally, the last iteration in each inner loop (i.e. where k=N−1) assigns values to two accumulators (rather to one accumulator and one carry, as in other iterations), $$k=N-1: A_{j+N}A_{j+N-1} \leftarrow 2X_j * X_{N-1} + C_{j,N-2} + A_{j+N-1}.$$

At the completion of the algorithm, the result words $Z_l$ may be read off the final accumulator values of the corresponding order:

$$0 \leq l \leq 2N-1: Z_l \leftarrow A_l.$$

The indices jk in the notation $C_{jk}$ are retained for illustrative purposes only, to indicate the operation $X_j * X_k$ that leads to the specific carry value $C_{jk}$. It shall be pointed out, however, that in computing implementations of the squaring algorithms described in the present disclosure, it may be sufficient to store only one carry value at any given step of algorithms implementation. Carries may be overwritten after each step is completed. Accordingly, because carries computed within a given loop j need not be reused by the next loop k+1, a single register of the size N may be sufficient to store (one after another) all carry values that may appear during execution of the described algorithms.

FIG. 1A illustrates schematically an implementation of an efficient squaring algorithm with loops of unequal length for an exemplary case of an input number having N=5 words. The directions of carry operations are indicated with dashed arrows. The sequence of cells (iterations) used to determine accumulators $A_l$ of a given order l is indicated with solid arrows. The operands (words) $X_j$ of the multiplicand are marked along the horizontal direction with the corresponding values of j. The operands (words) $X_k$ of the multiplier are similarly marked with the value of k along the vertical direction. There is no special significance to the terms "multiplicand" and "multiplier" in the context of FIG. 1A (and other parts of this disclosure), and the two terms are interchangeable. For the sake of nomenclature and the ease of reference, the term "multiplicand" is used to indicate a set of words ($0 \leq j \leq N-1$) sequenced by the outer loop of the algorithm, and the term "multiplier" is used to indicate a set of words ($j \leq k \leq N-1$) sequenced by the inner loops of the algorithm. As indicated in FIG. 1, the carries are confined to each inner loop and are not carried over to other inner loops. In contrast, accumulators propagate across different inner loops. Accumulator of a given order $A_l$ is calculated once during execution of a particular inner loop. The ultimate values of the accumulators—denoted by boldfaced $A_l$—determine the word values of the result of squaring, as described above.

The algorithm illustrated in FIG. 1A optimizes load operations as each of the multiplicand operands has to be loaded only once per execution of an inner loop. However, because inner loops have different lengths, the algorithm of FIG. 1A is difficult to use in parallel to Montgomery reduction, especially for a finely integrated Montgomery reduction, where each iteration of the efficient squaring algorithm is followed with one Montgomery reduction operation on the result of the iteration. From a perspective of a hardware efficiency, it is advantageous to make all inner loops of the same length, which may be equal to the number of words in the number that is being squared.

Figure 1B:
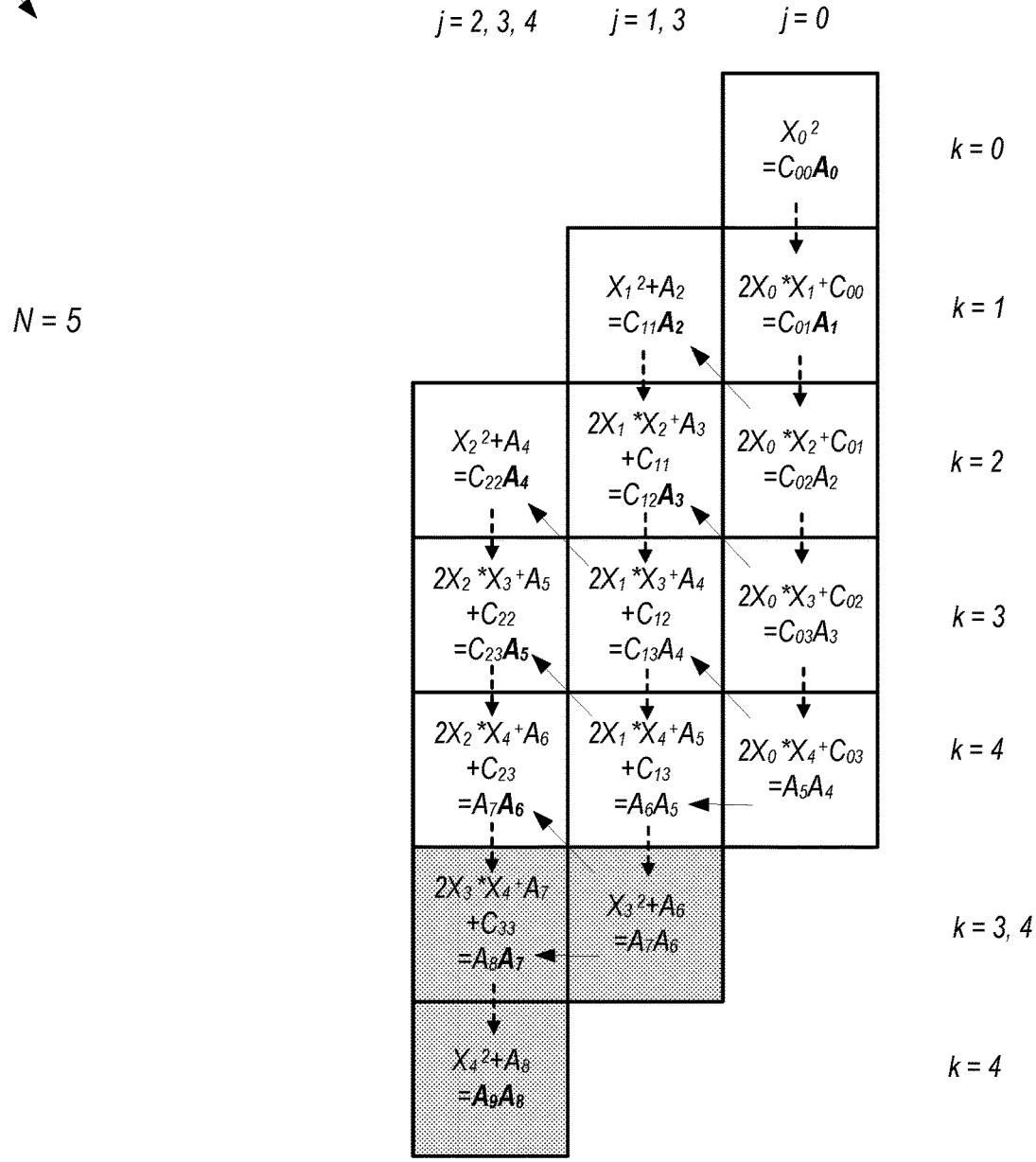
FIG. 1B illustrates schematically an implementation of an efficient squaring algorithm with loops of equalized length for an exemplary case of an input number having N=5 words.

Aspects of the present disclosure address this and other shortcomings of the algorithm of FIG. 1A by remapping the algorithm in such a way as to make all inner loops of the same length and, therefore, to make the improved algorithm combinable with the Montgomery reduction. FIG. 1B illustrates schematically an implementation of an efficient squaring algorithm with loops of equalized length for an exemplary case of an input number having N=5 words. As shown in FIG. 1B, the iterations of the last two inner loops j=3 and j=4 are appended to the loops j=1 and j=2 so that each of the loops has the same length-five iterations per loop. Specifically, an iteration [j, k] is moved to a new position [k−2,j+2] so that the sum of the horizontal and vertical "coordinates" of the iteration (which represents the order l) remains unchanged. The moved iterations are indicated by shading. As in the case of the algorithm of FIG. 1A, carries propagate along the same inner loop while accumulators cross over between adjacent inner loops.

It may be noticed that the order of multiplications in FIG. 1B is reversed in some instances compared with FIG. 1A. For example, the two operations of l=7 order (iterations j=2, k=4 and j=3, k=3) are now reversed. This amounts to interchanging an order in which the sum $S_6$ is computed but does not affect the determination of the corresponding accumulator $A_6$ (which ultimately becomes the result word Z). It may also be noted that the carry and the accumulator are interchanged for some iterations, compared to FIG. 1A. In particular, in the algorithm of FIG. 1A, the iteration j=3, k=3 is the terminal iteration for $A_6$ (the determination of the result word $Z_6$ is concluded therein) but the operations performed in this iteration yield the carry $C_{33}$ that propagates to the operations of the next order l=7. The new location of this iteration, namely j=1, k=5 of FIG. 1B, does not result in a carry because j=1, k=5 is the final iteration of the inner loop j=1). Conversely, the old iteration j=2, k=4 used to be the last iteration of the inner loop j=2 of FIG. 1A and, therefore, did not yield a carry but produced an accumulator to be taken as the starting value for $A_7$ into the next inner loop l=7. It is not difficult to see that such swapping of carries and accumulators in the affected iterations does not change the result of the algorithm. This happens because the distinction between carries and accumulators is purely semantic for the diagonal iterations j=k (terminal iterations for the accumulators) and the last iterations of each loop, k=N−1 (terminal iterations for carries). Accordingly, the swapping of these iterations upon remapping from FIG. 1A to FIG. 1B does not change the result for the sums $S_l$ and merely modifies the order of the corresponding operations-various multiplications and summations performed therein.

Figure 2A:
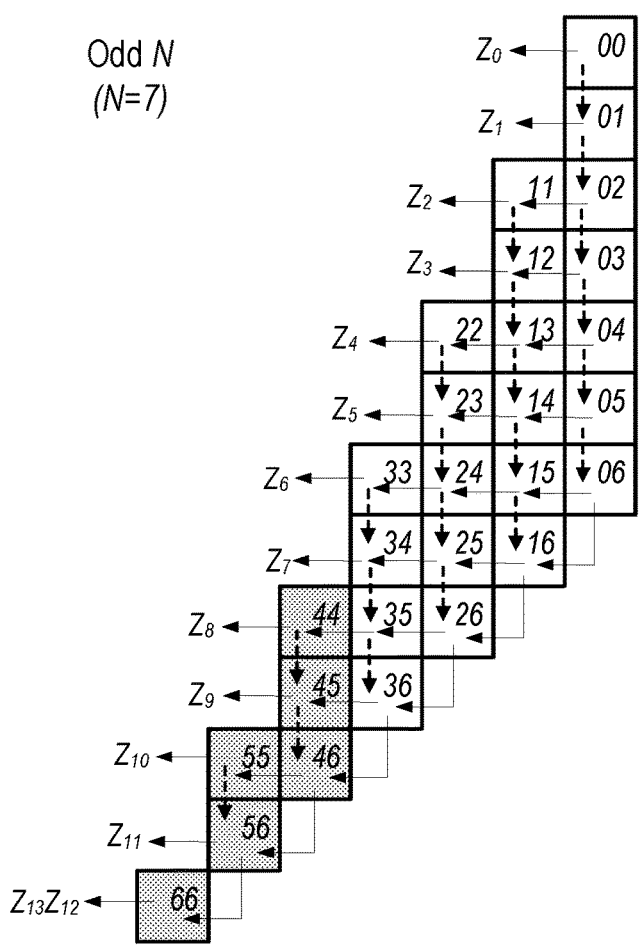
FIG. 2A illustrates schematically an implementation of an efficient squaring algorithm with inner loops of unequal length for an odd number (N=7) of words in an input number.
Figure 2B:
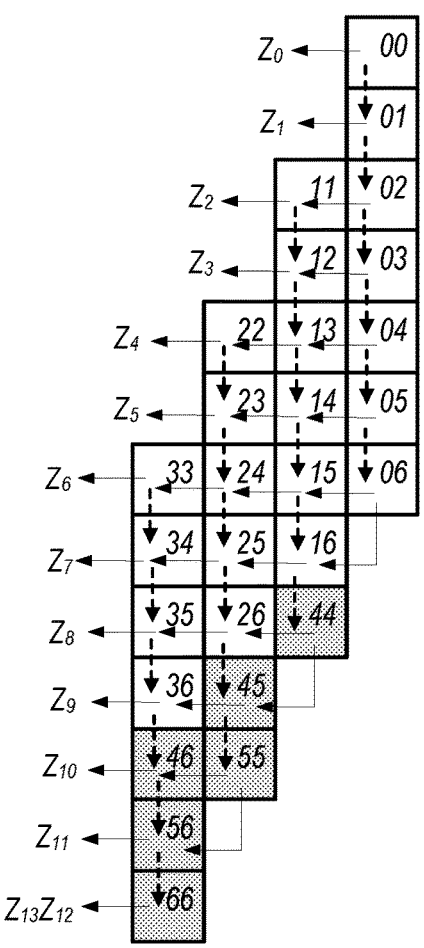
FIG. 2B illustrates schematically an implementation of a remapped algorithm with equalized inner loops for an odd number (N=7) of words in an input number.

FIGS. 2A-B and 3A-B illustrate an order of operations in some exemplary implementations of an efficient squaring algorithm with loop equalization capable of being performed parallel with Montgomery reduction for odd and even number N of words in an input number. FIG. 2A illustrates schematically an implementation of an efficient squaring algorithm with inner loops of unequal length for an odd number (N=7) of words in an input number. FIG. 2B illustrates schematically an implementation of a remapped algorithm with equalized inner loops for an odd number (N=7) of words in an input number. As in FIG. 1A, the outer loop of the algorithm of FIG. 2A selects consecutive values of j from 0 to N−1 corresponding to different vertical columns (inner loops), from the rightmost (j=0) to the leftmost (j=N−1) columns. For a given value of j, a corresponding inner loop selects words $X_k$ and multiplies them by $X_j$ and stores the values of the resulting accumulator (a low word) for the next inner loop k+1 and stores the carry for the next iteration of the currently executed inner loop k. Solid lines indicate where stored accumulator values are transferred and dashed lines indicate where the carries are used. Each iteration is marked by its jk indices. In contrast to the layout of FIGS. 1A-B, different horizontal rows in FIGS. 2A-B are arranged by the order number l=j+k (rather than by the value k). Accordingly, each subsequent column is shifted by one cell down relative to the previous column. Accordingly, the accumulators are transferred horizontally rather than diagonally. The ultimate accumulator of each row yields the corresponding result word $Z_l$ (with the most significant result word $Z_{2N-1}$ given by the high word of the very last iteration).

The efficient squaring algorithm with equalized loops for odd N, illustrated in FIG. 2B, has the total of (N+1)/2 inner loops. The first inner loop is unmodified. The iterations of the remaining (N−1)/2 inner loops of the squaring algorithm with unequal loops (shaded cells) are executed in the modified algorithm as extensions of unmodified loops (white cells) so that the total length of each of the resulting loops is N. More specifically each cell within the last (N−1)/2 inner loops is repositioned to a new location according to:

$$[j,k] \to \left[k - \frac{N-1}{2}, j + \frac{N-1}{2}\right].$$

The direction of flows of accumulators and carries, as well as the read locations for the result words remain the same as in the squaring algorithm with unequal loops.

Figure 3A:
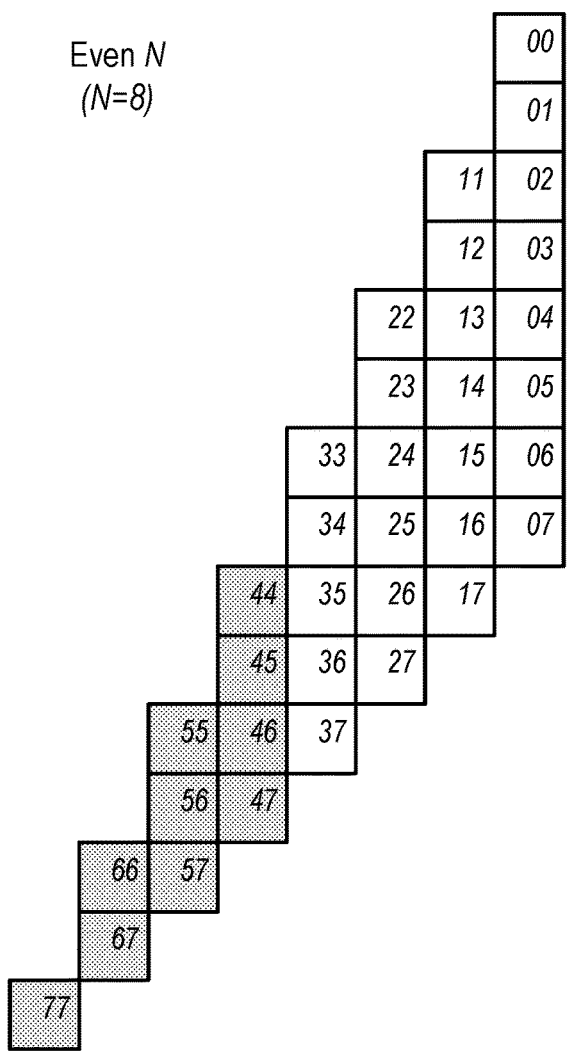
FIG. 3A illustrates schematically an implementation of an efficient squaring algorithm with inner loops of unequal length for an even number (N=8) of words in an input number.
Figure 3B:
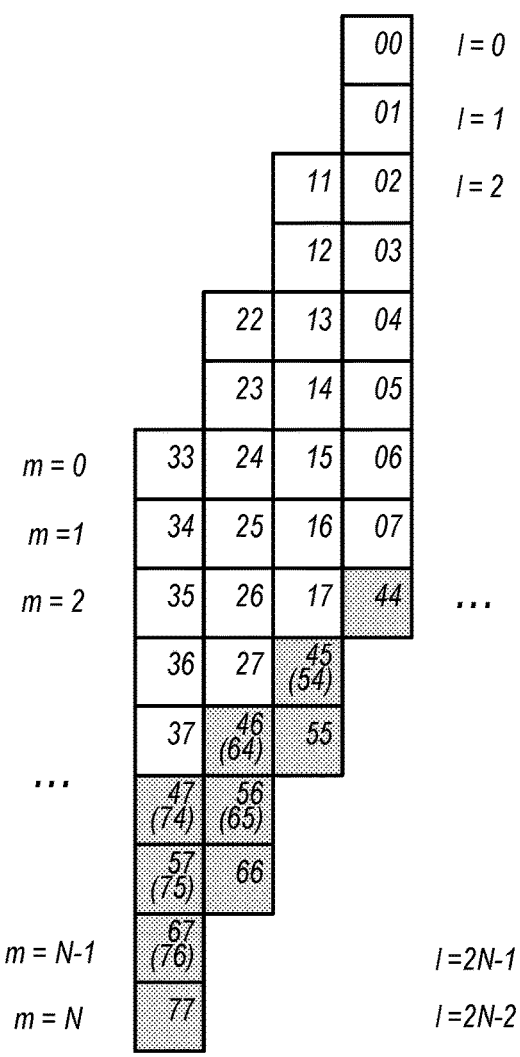
FIG. 3B illustrates schematically an implementation of a remapped algorithm with equalized inner loops for an even number (N=8) of words in an input number

FIGS. 3A-B illustrate adjustments to be made if the number of words N in the input number X is even. For the sake of concreteness, the case of N=8 is illustrated even though the algorithm can be similarly implemented for any even N. For brevity, the flows of accumulators and carries are omitted from FIGS. 3A-B, but they are understood to be similar to the patterns as shown in FIGS. 1A-B and FIGS. 2A-B. Likewise, the pattern of reading the result words $Z_l$ is the same as that of FIGS. 1A-B and FIGS. 2A-B.

The efficient squaring algorithm with equalized loops with even N, as illustrated in FIG. 3B, has the total of N/2 inner loops. All loops are modified. The iterations of the last N/2 inner loops of the squaring algorithm with unequal loops (shaded cells) are now to be executed as extensions of unmodified loops (white cells) so that the total length of each of the resulting loops is N+1 iterations. More specifically, each iteration within the last (N−1)/2 inner loops is repositioned to a new location follows $$[j,k] \to \left[k, -\frac{N}{2}, j + \frac{N}{2}\right].$$

The direction of transfer of accumulators and carries, as well as the read locations for the result words remain the same as in the squaring algorithm with unequal loops.

As indicated in FIG. 3B with respect to the relocated iterations with unequal indices, the order of multiplication performed in such iterations does not change the result: $X_j * X_k = X_k * X_j$. As depicted with the reversed order of the corresponding indices (in parentheses), this fact may be used to support the objective of minimizing a number of times the words of the multiplicand are loaded within each inner loop. For example, during execution of the third inner loop (j=2), as shown in FIG. 3B, the word $X_2$ may first be loaded and six iterations (from k=2 to k=7) may be executed. Subsequently, the word $X_6$ may be loaded and the remaining three iterations may be executed before the processing device begins execution of the fourth inner loop by loading the word $X_3$. In the more general case of arbitrary even N, an inner loop j may be executed as follows: 1) load $X_j$ and perform multiplications by $X_k$ with k ranging from j to N−1; 2) load $X_{j+N/2}$ and perform multiplications by $X_k$ with k ranging from N/2 to j+N/2. The total length of each inner loop is N+1.

The following expressions summarize operations performed within each inner loop for even values of N, with index m enumerating iterations to be executed within each inner loop j (0≤m≤N):

$0 \le j \le N/2$:

$m = 0: C_{jj}A_{2j} \leftarrow X_j^2 + A_{2j};$ $1 \le m \le N - j - 1: C_{j,j+m}A_{2j+m} \leftarrow 2X_j * X_{j+m} + C_{j,j+m-1} + A_{2j+m};$ $N - j \le m \le N - 1:$ -continued $$C_{j,j+m}A_{2j+m} \leftarrow 2X_{j+\frac{N}{2}} * X_{j+m-\frac{N}{2}} + C_{j,j+m-1} + A_{2j+m};$$

$$m = N: A_{2j+N+1}A_{2j+N} \leftarrow X_{j+N/2}^2 + C_{j,j+N-1};$$

$$Z_l \leftarrow A_l.$$

Referring back to FIG. 2B, in case of an odd value N, the corresponding order of execution may be similar to the case of even values N. Specifically, for a given inner loop j>0, the efficient squaring algorithm with loop equalization may be executed as follows: 1) load $X_j$ and perform multiplications by $X_k$ with k ranging from j to N−1; 2) load $X_{j+(N−1)/2}$ and perform multiplications by $X_k$ with k ranging from (N+1)/2 to j+(N−1)/2. The total length of each inner loop is N.

The following expressions summarize operations performed within each inner loop for odd values of N, with index m enumerating iterations to be executed within each inner loop j (0≤m≤N for each loop):

$$j = 0:$$

$$m = 0: C_{00}A_0 \leftarrow X_0^2;$$

$$0 \le m < N - 1: C_{0m}A_m \leftarrow 2X_0 * X_m + C_{0,m-1};$$

$$m = N - 1: A_{0,N}A_{0,N-1} \leftarrow 2X_0 * X_{N-1} + C_{0,N-2};$$

$$1 \le j \le (N+1)/2:$$

$$m = 0: C_{jj}A_{2j} \leftarrow X_j^2 + A_{2j};$$

$$1 \le m \le N - j - 1: C_{j,j+m}A_{2j+m} \leftarrow 2X_j * X_{j+m} + C_{j,j+m-1} + A_{2j+m};$$

$$N - j \le m \le N - 2:$$

$$C_{j,j+m}A_{2j+m} \leftarrow 2X_{j+\frac{N-1}{2}} * X_{j+m-\frac{N-1}{2}} + C_{j,j+m-1} + A_{2j+m};$$

$$m = N - 1: A_{2j+N+1}A_{2j+N} \leftarrow X_{j+\frac{N-1}{2}}^2 + C_{j,j+N-2};$$

$$Z_l \leftarrow A_l.$$

Although the order of iterations indicated in FIGS. 2B and 3B may efficiently minimize the order of load operations (e.g., at most two multiplicand words loaded per inner loop), the order of execution of iterations corresponding to a given order l may be different. For example, the order of execution of iterations for the order l=10 shown in FIG. 3B is 55 (inner loop j=1), 46 (inner loop j=2), 37 (inner loop j=3). In some implementations, the order may be changed, without any change of the outcome of computations. For example the order may be 46 (inner loop j=1), 37 (inner loop j=2), 55 (inner loop j=3). Such permutations do not change the outcome of the computations, as long as iterations corresponding to the order l involve multiplication of $X_a * X_b$ with a+b=l.

With the inner loops having the same length (number of iterations), Montgomery reduction may be integrated into the efficient squaring algorithm. In one implementation—a finely integrated Montgomery reduction—each iteration of the efficient squaring algorithm may be followed with the Montgomery reduction of the yield of the iteration, such as the accumulator value and the carry value, before the next iteration of the squaring algorithm is undertaken. In another implementation-a coarsely integrated Montgomery reduction—the Montgomery reduction may be performed on the yield of an inner loop of the algorithm after completion of this inner loop and before execution of the next inner loop is commenced.

Figure 4:
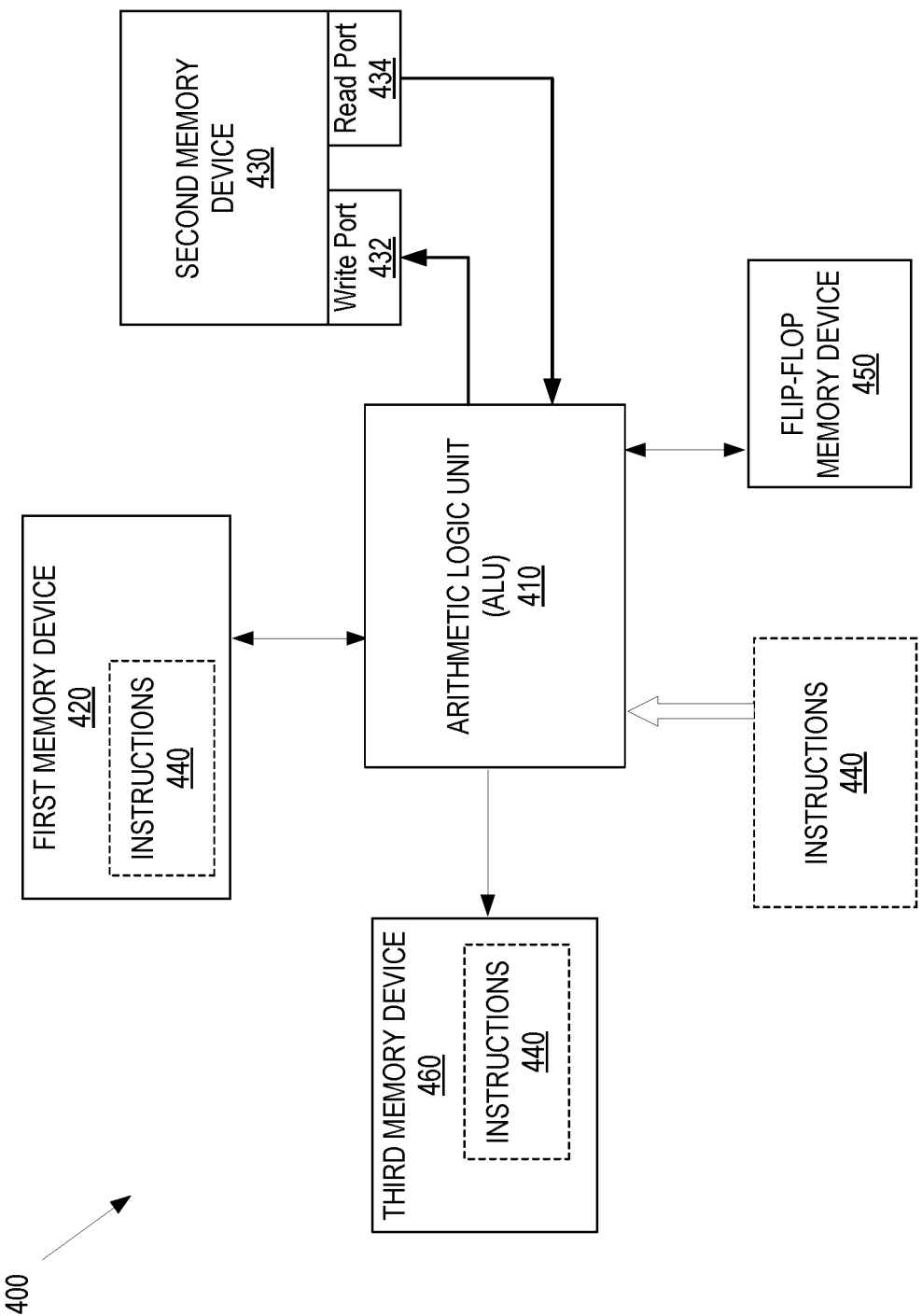
FIG. 4 is an exemplary block diagram of the components of a processing device capable of performing the efficient squaring algorithm with loop equalization, in accordance with one or more aspects of the present disclosure.

FIG. 4 is an exemplary block diagram of the components of a processing device 400 capable of performing the efficient squaring algorithm with loop equalization, in accordance with one or more aspects of the present disclosure. "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), flash memory, flip-flop memory, or any other device capable of storing data.

As shown in FIG. 4, the processing device 400 may include, among other things, an ALU 410. The ALU 410 may be any digital electronic circuit capable of performing arithmetic and bitwise operations on integer binary numbers. The ALU may be a component part of a bigger computing circuit, such as a central processing unit (CPU), which in turn may be a part of any server, desktop, laptop, tablet, phone, or any other type of computing device. The computing device may include multiple ALUs 410 and CPUs. The ALU 410 may receive input in the form of data operands from one or more memory devices, such as the memory devices 420, 430, 450, and 460. The ALU may also receive code/instructions input 440. The instructions 440 may indicate the nature and order of operations to be performed on input data operands. The instructions 440 may also indicate how output of the ALU operations is to be handled, in particular, what memory devices are to store the output of the ALU operations.

In one exemplary implementation, the words $X_k$ of the input number may be stored in a first memory device 420, which may be a RAM (e.g. SRAM or DRAM) device in one implementation. In other implementations, the first memory device 420 may be a flash memory device (NAND, NOR, 3DXP, or other type of flash memory) or any other type of memory. In one implementation, the first memory device 420 may have one input/output port and may be capable of receiving (via a write operation) or providing (via a read operation) a single operand to the ALU 410 per clock cycle. In such implementations, to perform both a read operation and a write operation involving the first memory device 420, a minimum of two clock cycles may be required.

A second memory device 430 may be a scratchpad memory device, in one implementation. The scratchpad may be any type of a high-speed memory circuit that may be used for temporary storage of data capable of being retrieved rapidly. To facilitate rapid exchange of data with the ALU 410, the second memory device 430 may be equipped with multiple ports, e.g. a write port 432 and a read port 434, in one implementation. Each port may facilitate one operation per clock cycle. As a result, per each clock cycle, the ALU 410 may receive one word from the second memory device 430 (via a read port 434) and may output one word to the second memory device 430 (via a write port 432). The second memory device 430 may be used for storing accumulators $A_l$ during execution of the efficient squaring algorithm, in one implementation.

In some implementations, the processing device 400 may have an additional memory device, which may be a flip-flop memory device 450. The flip-flop memory device 450 may be any electronic circuit having stable states to store binary data, which may be changed by appropriate input signals. The flip-flop memory device 450 may be used for storing carries during execution of the efficient squaring algorithm, in one implementation. In some implementations, the processing device 400 may optionally have a third memory device 460, which may be any aforementioned type of memory device. The third memory device 460 may be used to store the result words $Z_l$ of the efficient squaring algorithm, in one implementation. In some implementations, the third memory device 460 may be absent, and the output may be kept in the second memory device 430 (e.g., the scratchpad memory) or written to the first memory device 420, in one implementation. In some implementations, the first memory device 420 and/or the third memory device 460 may store instructions 440 for the ALU 410, as depicted in FIG. 4.

Figure 5:
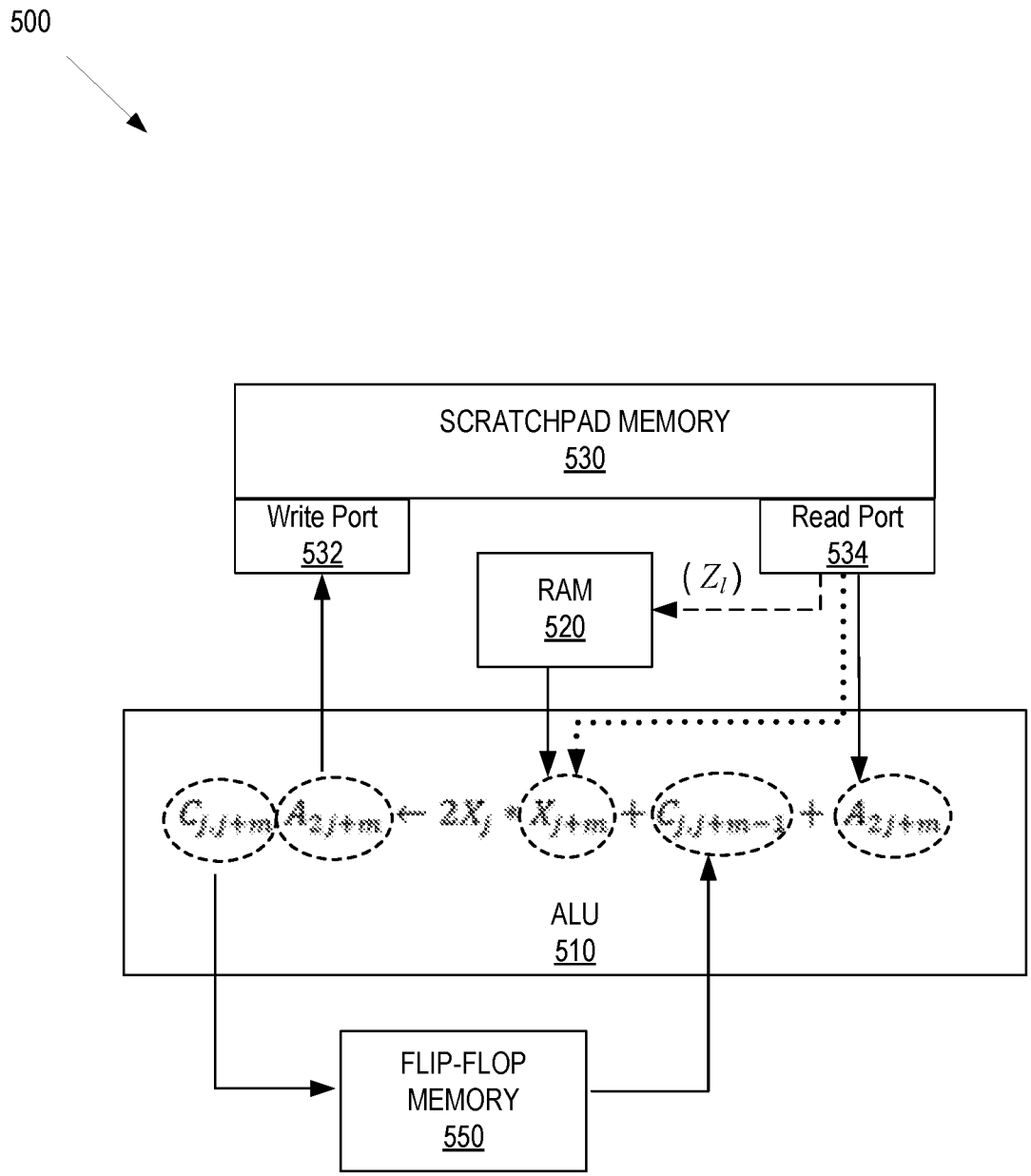
FIG. 5 is a schematic illustration of implementation of the efficient squaring algorithm with loop equalization on the processing device 400, in accordance with some aspects of the disclosure.

FIG. 5 is a schematic illustration of implementation of the efficient squaring algorithm with loop equalization on the processing device 400, in accordance with some aspects of the disclosure. Shown is one execution of operations corresponding to an iteration m of the inner loop j, which involves multiplication of the word operands, $X_j$ and $X_{j+m}$ (other operations may be performed in a similar fashion). The components shown in FIG. 5 that differ from the components of FIG. 4 by the first digit only, may indicate the same or a similar device. For example, a RAM 520 may be the same as (or similar to) the first memory device 420 and a scratchpad memory 530 may be the same as (or similar to) the second memory device 430.

The operations may be perfumed as follows. Upon receiving instructions 440, the ALU 410 may begin the j-th inner loop with reading the word operand $X_j$ from the first memory device 420. At the beginning of execution of the the j-th inner loop, the ALU 410 may retrieve the word operand $X_{j+m}$ from the RAM 520 (during execution of the m=0 cell, the ALU 410 performs the squaring operation $X_j^2$ that does not require reading an additional operand). Additionally, the ALU 410 may read an accumulator word $A_{2j+m}$ from the scratchpad memory 530 via a read port 534. The ALU 410 may also read a carry value $C_{j,j+m-1}$ from the flip-flop memory 450 stored therein during the previous iteration m−1.

After performing one multiplication and two addition operations as shown in FIG. 5, the ALU 510 may obtain a double-word result. The ALU 510 may write the new accumulator (the low word of the double-word result) $A_{2j+m}$ into the scratchpad memory 530 via a write port 532. The ALU 510 may also store the new carry value $C_{j,j+m}$ into the flip-flop memory 450 and overwrite the previous carry value $C_{j,j+m-1}$ stored therein. The ALU 510 may then (e.g., upon receiving further instructions 440) execute the next iteration m+1 of the inner loop j. In those instances when the cell m is the last cell of the inner loop j, the ALU 510 may receive instructions 440 to begin execution of the next inner loop j+1. If the loop j is the last inner loop of the algorithm, the result words may be read from the scratchpad memory 530: $Z_l \leftarrow A_l$. The read result words may then be stored in RAM 520, in one implementation.

At the conclusion of a squaring operation, performed as indicated in FIG. 5, the result words $Z_l$ may be in the scratchpad memory 530 but may need to be transferred (written back) into RAM 520. Such a transfer may require additional computational time. In some implementations, to improve the efficiency of the algorithm, a writeback operation may be optimized as follows. For example, after the squaring operation is performed, $Z_{2N-1} \ldots Z_1 Z_0 \leftarrow X^2$, a subsequent operation may be initiated, which may be a multiplication (e.g., squaring) operation, such as a squaring operation $Y^2$, involving a different number Y having M words. When the first iteration of the outer loop (j=0) of squaring $Y^2$ is performed, no accumulator value has to be read from the scratchpad memory 530. Accordingly, the read port 534 of the scratchpad memory may remain idle during all M iterations of the second loop performed within the first iteration of the outer loop. To improve the efficiency of the scratchpad memory utilization, the first M words ($Z_{M-1} \ldots Z_1 Z_0$) out of 2N words of $X^2$ may be written from the scratchpad memory 530 into RAM 520 through the read port 534 during the M iterations (k=0, 1, . . . M−1) of the second loop performed for j=0. This operation is schematically illustrated by a dashed line on FIG. 5. In some implementations, the last M words or any other M words of of $X^2$ may be transferred to RAM 520.

In some instances, the result of the previous operation, $Z=Z_{2N-1} \ldots Z_1 Z_0$, may be the same number X that is to be squared in the next operation. In such instances, the words $Z_0, Z_1, \ldots, Z_{2N-1}$ (which are also the words of the number X) may be read directly from the scratchpad memory 530 (as indicated schematically by a dotted line in FIG. 5). The intermediate result $Z=Z_{2N-1} \ldots Z_1 Z_0$, may also be stored in RAM 520 (via a separate read-write operation), in some implementations. In other implementations, the intermediate result Z may not be transferred from the scratchpad memory 530 to RAM 520.

Figure 6:
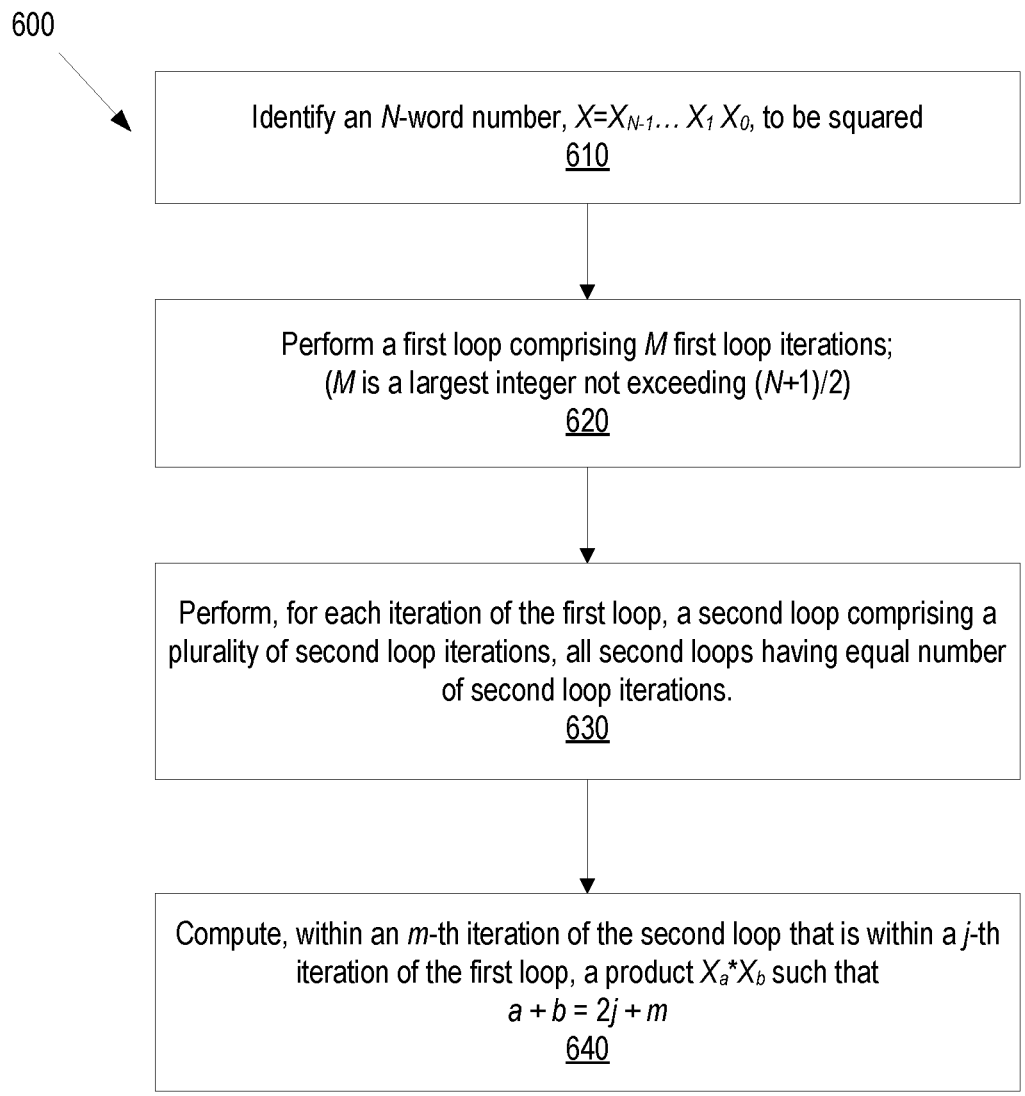
FIG. 6 depicts a flow diagram of illustrative example of a method of efficient squaring with loop equalization, in accordance with some implementations.
Figure 7:
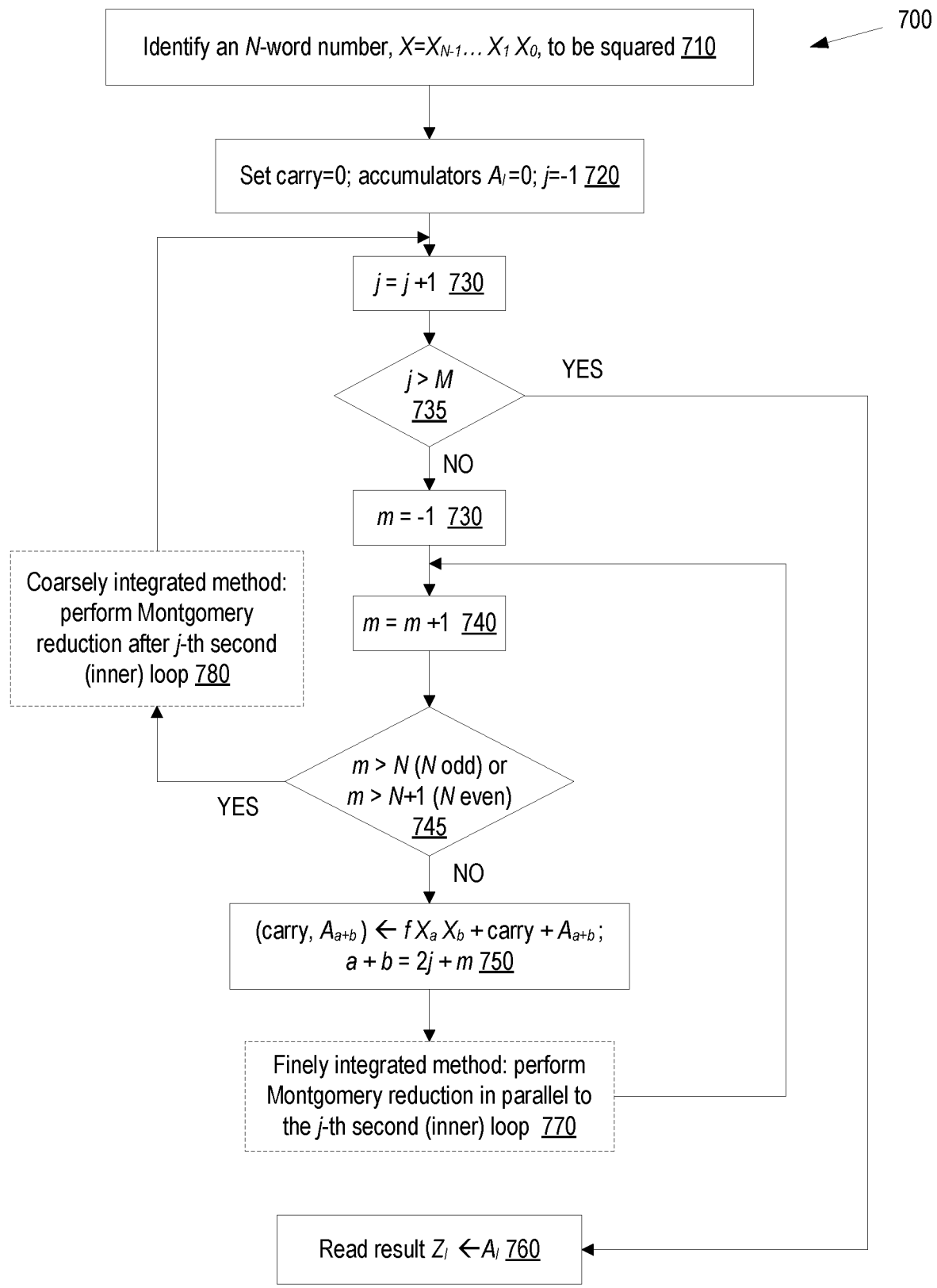
FIG. 7 depicts a flow diagram of another illustrative example of a method of efficient squaring with loop equalization and integrated with Montgomery reduction, in accordance with some implementations.

FIG. 6 and FIG. 7 depict flow diagrams of illustrative examples of methods 600 and 700 of efficient squaring with loop equalization, in accordance with some implementations. Methods 600, 700 and/or each of their individual functions, routines, subroutines, or operations may be performed by one or more processing units of the computing system implementing the methods, e.g., a processor containing the ALU 410 or 510. In certain implementations, methods 600 and 700 may be performed by a single processing thread. Alternatively, methods 600 and 700 may be performed by two or more processing threads, each thread executing one or more individual functions, routines, subroutines, or operations of the method. In an illustrative example, the processing threads implementing methods 600 and 700 may be synchronized (e.g., using semaphores, critical sections, and/or other thread synchronization mechanisms). Alternatively, the processing threads implementing methods 600 and 700 may be executed asynchronously with respect to each other. Various steps of the methods 600 and 700 may be performed in a different order compared to the order shown in FIGS. 6 and 7. Some steps may be performed concurrently with other steps.

The method 600 may begin with the processor/ALU identifying N-word input number, $X=X_{N-1} X_{N-2} \ldots X_1 X_0$, to be squared (610). The identification may be pursuant to instructions received by the processor/ALU. The instructions may identify storage location where the input number is residing. For example, the input number may be located in RAM or other memory device communicatively coupled to the processor/ALU. The processor/ALU implementing the method 600 may start a first (outer loop) comprising M first loop iterations, where M may be a largest integer not exceeding (N+1)/2. Namely, for an even N, such integer may be M=N/2 while for an odd N, such integer may be M=(N+

1)/2. The first loop may cycle through iterations in which one or two words of the input number may be selected and loaded into ALU, so that each of the words $X_a$ may be selected and loaded once during execution of the method 600, as explained in more detail above in relation to FIGS. 2B and 3B.

The method 600 may continue with the processor/ALU starting a second (inner) loop that is nested inside the first loop, such that all second loops have equal number of second loop iterations. For example, for even N, the number of iterations inside each second loop may be N+1, whereas for odd N, the number of iterations inside each second loop may be N (in other words, the number of iterations inside each second loop may be the largest odd number not exceeding N+1). As disclosed above, the length of second loops is selected in a manner that optimizes the number of times that various words of the input number are loaded into the ALU so that each product $X_a*X_b$ may need to be computed only once.

At each iteration of the second loop, a product $X_a*X_b$ may be computed. The selection of the words $X$ and $X_b$ for execution during a particular iteration of the second loop may be carried out in such a way that optimizes (minimizes) the number of word loadings, as described above in relation to FIGS. 2B and 3B. In some implementations, the sequence of loadings may be sub-optimal, e.g., different from the sequence depicted in FIGS. 2B and 3B as long as within an m-th iteration of the second loop that is within a j-th iteration of the first loop, a product $X_a*X_b$ is calculated such that a+b=2j+m (640). On the other hand the specific values of a and b may be chosen arbitrarily as long as their sum is so fixed. Enumeration of the first loop iterations starts with j=0, e.g., j=0, 1, . . . M. Enumeration of the second loop iterations also starts with m=0, e.g., m=0, 1 . . . N/2, for even N, and m=0, 1 . . . (N+1)/2, for odd N.

FIG. 7 depict a flow diagram of another illustrative examples of method 700 of efficient squaring with loop equalization and integrated with Montgomery reduction, in accordance with some implementations. After identifying an input number (710), the method may continue with the processor/ALU setting the carry value and all accumulators $A_l$ to zero prior to start of the first (j=0) iteration of the first (outer) loop (720). After increasing the value j by one (730), the decision-making block 735 verifies that not all first loop iterations have been performed yet and the method 700 sets and increases the counter m for the second (inner) loop (730). The decision-making block 745 verifies that not all second loop iterations have been performed yet and the method 700 continues with performing computations that belong to an m-th iteration of the second loop that is within a j-th iteration of the first loop. More specifically, the ALU may compute (cary, $A_{a+b}$)←$fX_aX_b$+carry+$A_{a+b}$, where f=1 if a=b and f=2 if a*b. During this computation, the ALU may add carries from the preceding iteration of the second loop and accumulator values from the preceding iteration of the first loop, as explained in more detail above in reference to FIGS. 2, 3, and 5. The ALU may then store the high word as a new carry and a low word as a new accumulator value.

The block 770 may be repeated until it is determined at decision-making blocks 735 and 745 that all iterations of both loops have been executed, in which case the results of the algorithm execution may be read from the accumulator values (760) and stored (e.g. in RAM or any other memory device). At block 770, an optional operation may be performed—the finely integrated Montgomery reduction-upon the results of the computations carried out at each iteration of the second loop. Optionally, the Montgomery reduction may be performed in a coarsely integrated fashion (780) meaning that the Montgomery reduction is executed after all iterations of a particular second loop are completed.

Figure 8:
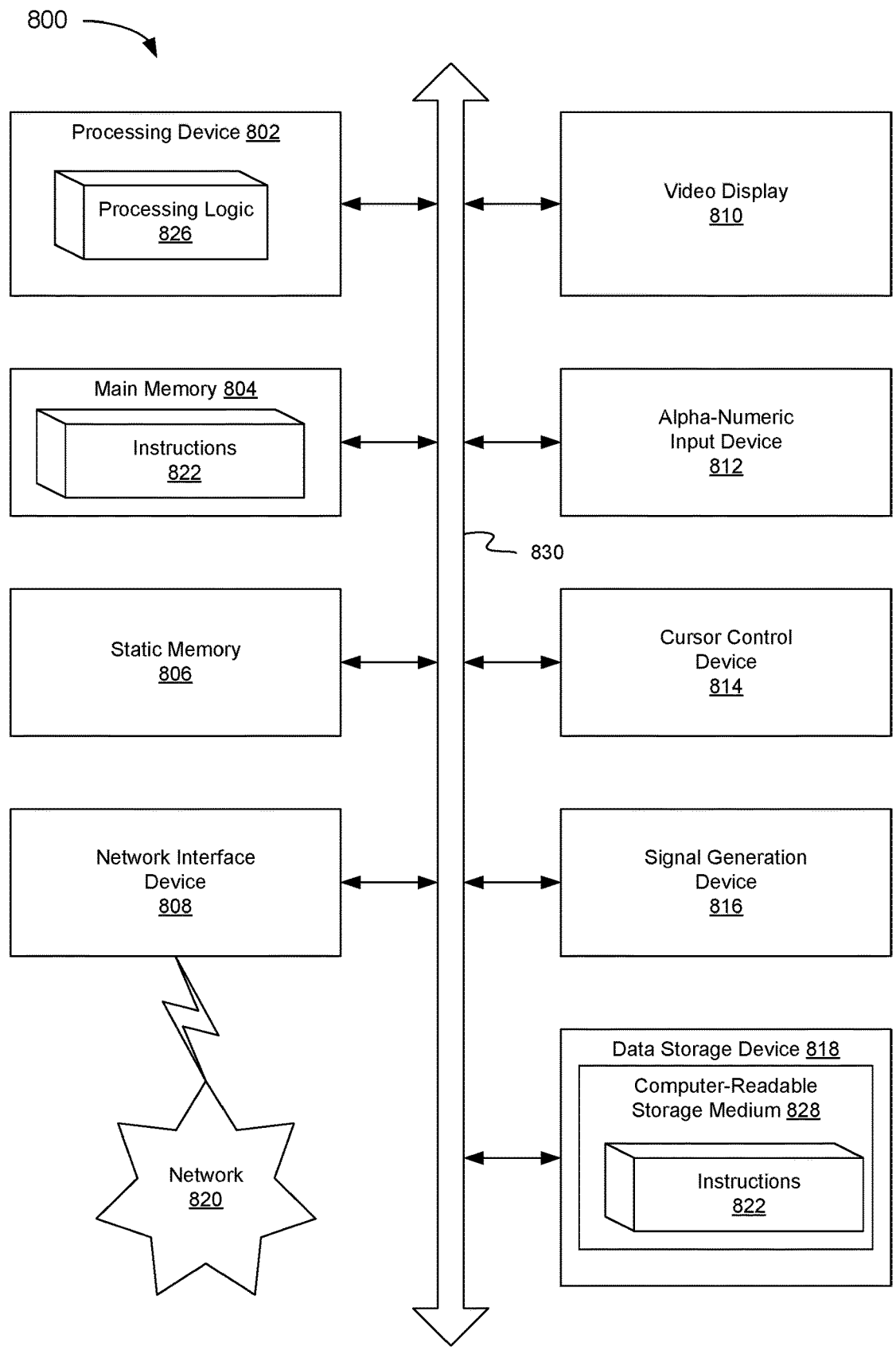
FIG. 8 depicts a block diagram of an example computer system operating in accordance with one or more aspects of the present disclosure.

FIG. 8 depicts a block diagram of an example computer system 800 operating in accordance with one or more aspects of the present disclosure. In various illustrative examples, computer system 800 may represent the processing device 400, illustrated in FIG. 4.

Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing method 200 of seamless server switching during remote-access application execution, and/or method 300 of terminating execution of the application on the first terminal server, and/or method 350 of starting execution of the application on the second terminal server to the client device.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing method 200 of seamless server switching during remote-access application execution, and/ or method 300 of terminating execution of the application on the first terminal server, and/or method 350 of starting execution of the application on the second terminal server to the client device.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to perform a cryptographic operation, the method comprising:
  receiving an input data associated with one or more messages communicated between two or more nodes associated with a common cryptography system;
  identifying an N-word number, $X=X_{N-1} \ldots X_1 X_0$, associated with the input data;
  computing, by a processing device, a square of the N-word number X, by performing a first loop comprising M first loop iterations, wherein M is a largest integer number not exceeding (N+1)/2, each of the M first loop iterations comprising a second loop that comprises a plurality of second loop iterations, wherein an iteration m of the second loop that is within an iteration j of the first loop comprises computing a product $X_a * X_b$ of a word $X_a$ and a word $X_b$, wherein a+b=2j+m, j≥0 and m≥0, and wherein all second loops have an equal number of second loop iterations; and
  obtaining, using the computed square of the N-word number X, an output data; and
  performing the cryptographic operation comprising at least one of:
    obtaining, using the output data, a cryptographic key, and processing, using the cryptographic key to obtain at least one of: (i) a ciphertext for the one or more messages or (ii) a plaintext for the one or more messages,
    or
    obtaining, using the output data, a digital signature authentication of the one or more messages.

2. The method of claim 1, wherein the iteration m of the second loop that is within the iteration j of the first loop further comprises:

multiplying the product $X_a * X_b$ by f, wherein f=1 if a is equal to b and f=2 if a is not equal to b, adding a carry value stored during the iteration m−1 of the second loop;

adding an accumulator value $A_{a+b}$ stored during the iteration j−1 of the first loop;

storing a high word of a resulting number as a new carry; and storing a low word of the resulting number as the accumulator $A_{a+b}$.

3. The method of claim 2, further comprising:

determining that the iteration m of the second loop is a final iteration of the second loop; and storing the new carry value as an accumulator value $A_{a+b+1}$.

4. The method of claim 3, wherein the word $X_a$ is retrieved from a first memory device and the accumulator value $A_{a+b}$ is stored in a second memory device.

5. The method of claim 3, wherein the carry value is stored in a flip-flop memory.

6. The method of claim 3, further comprising, at the completion of the first loop, reading the stored accumulator value $A_l$ as a word l of $X^2$:

$$X^2 = (X_{N-1} \ldots X_1 X_0) * (X_{N-1} \ldots X_1 X_0) = A_{2N-1} \ldots A_1 A_0.$$

7. The method of claim 1, wherein the number of second loop iterations is N, if N is odd, and N+1, if N is even.

8. The method of claim 1, further comprising performing at least one Montgomery reduction on results of each first loop iteration.

9. The method of claim 1, further comprising performing at least one Montgomery reduction on results of each second loop iteration.

10. A system comprising:

a first memory device to store an N-word number $X = X_{N-1} \ldots X_1 X_0$, associated with an input data, wherein the input data is associated with one or more messages communicated between two or more nodes associated with a common cryptography system; and an arithmetic logic unit (ALU) communicatively coupled to the first memory device, wherein the ALU is to:

receive words of the N-word number X, compute a square of the N-word number X by performing a first loop comprising M first loop iterations, wherein M is a largest integer number not exceeding (N+1)/2, each of the M first loop iterations comprising a second loop that comprises a plurality of second loop iterations, wherein during an iteration m of the second loop that is within an iteration j of the first loop the ALU is to compute a product $X_a * X_b$ of a word $X_a$ and a word $X_b$, wherein a+b=2j+m, wherein j≥0 and m≥0, and wherein all second loops have an equal number of second loop iterations;

obtain, using the computed square of the N-word number X, an output data; and perform the cryptographic operation comprising at least one of:

obtain, using the output data, a cryptographic key, and process, using the cryptographic key to obtain at least one of: (i) a ciphertext for the one or more messages or (ii) a plaintext for the one or more messages, or obtain, using the output data, a digital signature authentication of the one or more messages.

11. The system of claim 10, further comprising a second memory device coupled to the ALU and a third memory device coupled to the ALU, and wherein during the iteration m of the second loop that is within the iteration j of the first loop the ALU is further to:

retrieve, from the second memory device, an accumulator value Act-kb stored therein during the iteration j−1 of the first loop;

retrieve, from the third memory device, a carry value stored therein during the iteration m−1 of the second loop;

multiply the product $X_a * X_b$ by f wherein f=1 if a is equal to b and f=2 if a is not equal to b, add the carry value;

add the accumulator value $A_{a+b}$;

determine a low word and a high word of a resulting number;

store, in the second memory device, the low word of the resulting number as an updated accumulator value $A_{a+b}$; and store, in the third memory device, the high word of the resulting number as a new carry value.

12. The system of claim 11, wherein the second memory device is a scratchpad memory device and the third memory device is a flip-flop memory device.

13. A non-transitory computer-readable medium storing instruction thereon, wherein the instructions, when executed by a processing device performing a cryptographic operation, cause the processing device to:

receive an input data associated with one or more messages communicated between two or more nodes associated with a common cryptography system;

identify an N-word number, $X = X_{N-1} \ldots X_1 X_0$, associated with the input data;

compute a square of the N-word number X by performing a first loop comprising M first loop iterations, wherein M is a largest integer number not exceeding (N+1)/2, each of the M first loop iterations comprising a second loop that comprises a plurality of second loop iterations, wherein an iteration m of the second loop that is within an iteration j of the first loop comprises computing a product $X_a * X_b$ of a word $X_a$ and a word $X_b$, wherein a+b=2j+m, wherein j≥0 and m≥0, and wherein all second loops have an equal number of second loop iterations; and obtain, using the computed square of the N-word number X, an output data, and;

perform the cryptographic operation comprising at least one of:

obtain, using the output data, a cryptographic key, and process, using the cryptographic key to obtain at least one of: (i) a ciphertext for the one or more messages or (ii) a plaintext for the one or more messages, or obtain, using the output data, a digital signature authentication of the one or more messages.

14. The non-transitory computer-readable medium of claim 13, wherein the iteration m of the second loop that is within the iteration j of the first loop further comprises:

multiplying the product $X_a * X_b$ by f wherein f=1 if a is equal to b and f=2 if a is not equal to b, adding a carry value stored during the iteration m−1 of the second loop;

adding an accumulator value $A_{a+b}$ stored during the iteration j−1 of the first loop;

storing a high word of a resulting number as a new carry value; and storing a low word of the resulting number as a new accumulator value $A_{a+b}$.

15. The non-transitory computer-readable medium of claim 14, further comprising:
   determining that the iteration m of the second loop is a final iteration of the second loop; and
   storing the new carry value as an accumulator value $A_{a+b+1}$.

16. The non-transitory computer-readable medium of claim 15, wherein the word $X_a$ is retrieved from a first memory device and the accumulator value $A_{a+b}$ is stored in a second memory device.

17. The non-transitory computer-readable medium of claim 15, wherein the carry value is stored in a flip-flop memory.

18. The non-transitory computer-readable medium of claim 15, further comprising, at the completion of the first loop, reading the stored accumulator value $A_l$ as a word l of $X^2$:

$$X^2 = (X_{N-1} \ldots X_1 X_0) * (X_{N-1} \ldots X_1 X_0) = A_{2N-1} \ldots A_1 A_0.$$

19. The non-transitory computer-readable medium of claim 13, wherein the number of second loop iterations is N, if N is odd, and N+1, if N is even.

20. The non-transitory computer-readable medium of claim 13, further comprising performing at least one Montgomery reduction on results of each first loop iteration or performing at least one Montgomery reduction on results of each second loop iteration.

* * * * *